(12) United States Patent
Laackmann et al.

(10) Patent No.: US 12,340,649 B2
(45) Date of Patent: Jun. 24, 2025

(54) CONSUMABLE COMPONENT APPARATUS

(71) Applicant: Infineon Technologies AG, Neubiberg (DE)

(72) Inventors: Peter Laackmann, Munich (DE); Markus Gail, Munich (DE)

(73) Assignee: Infineon Technologies AG, Neubiberg (DE)

( * ) Notice: Subject to any disclaimer, the term of this patent is extended or adjusted under 35 U.S.C. 154(b) by 458 days.

(21) Appl. No.: 17/034,710

(22) Filed: Sep. 28, 2020

(65) Prior Publication Data

US 2021/0097798 A1 Apr. 1, 2021

(30) Foreign Application Priority Data

Sep. 26, 2019 (DE) .......................... 102019125943.6

(51) Int. Cl.
*G07F 13/00* (2006.01)
*G06F 21/44* (2013.01)
*G07F 9/00* (2006.01)
*G07F 13/02* (2006.01)

(52) U.S. Cl.
CPC .............. *G07F 13/02* (2013.01); *G06F 21/44* (2013.01); *G07F 9/006* (2013.01)

(58) Field of Classification Search
CPC ........... G07F 13/02; G07F 9/006; G06F 21/44
USPC ........................................................ 235/381
See application file for complete search history.

(56) References Cited

U.S. PATENT DOCUMENTS

| | | | | |
|---|---|---|---|---|
| 6,193,058 B1* | 2/2001 | Yacko | ................ | B65D 81/3266 206/459.5 |
| 2004/0140013 A1* | 7/2004 | Yacko | .................... | B67D 7/348 141/94 |
| 2012/0254050 A1* | 10/2012 | Scrafford | ............... | G06Q 10/00 705/318 |
| 2015/0191007 A1* | 7/2015 | Anderson | ............ | B41J 2/04508 347/19 |

* cited by examiner

*Primary Examiner* — Daniel A Hess
(74) *Attorney, Agent, or Firm* — Banner & Witcoff Ltd.

(57) ABSTRACT

A consumable component apparatus including a receptacle region for receiving configured to receive a substance or material which is consumed under the control of a consumer device, an authentication circuit configured to authenticate the consumer device, and a switch coupled to the authentication circuit. The authentication circuit is configured to control the switch in such a way that the consumable component apparatus is activatable only if the consumer device is authenticated by means of the authentication circuit, and that the consumable component apparatus is deactivated if the consumer device is not authenticated by means of the authentication circuit.

21 Claims, 7 Drawing Sheets

CONSUMABLE COMPONENT APPARATUS

TECHNICAL FIELD

Exemplary embodiments generally relate to consumable component apparatuses.

BACKGROUND

Imitations are an important topic in end consumer markets with consumables. There is a high risk of copycat companies creating clones of consumable components which behave exactly like the original components. Authentication chips are typically used to protect consumable components. Their task generally is to verify that a consumable component apparatus (e.g. printer cartridge) can be identified as an original for the host device (e.g. the printer). In this example, it is only after the printer cartridge has been identified that the printer would recognize the cartridge as an original and use it for printing.

By this means, it is possible to prevent a non-original consumable from being used with an original device, or the user can be warned that the consumable is a non-original consumable. However, it may also be desirable to prevent an original consumable from being used with a non-original consuming device, e.g. in order to prevent misuse (e.g. overdosage) of a constituent.

BACKGROUND

In accordance with one exemplary embodiment, a consumable component apparatus is provided comprising a receptacle region for receiving a substance or material which is consumed under the control of a consumer device, an authentication circuit for authenticating the consumer device, and a switch coupled to the authentication circuit. The authentication circuit is configured to control the switch in such a way that the consumable component apparatus is activatable only if the consumer device is authenticated by means of the authentication circuit, and that the consumable component apparatus is deactivated if the consumer device is not authenticated by means of the authentication circuit.

BRIEF DESCRIPTION OF THE DRAWINGS

The figures do not reproduce the actual size relationships, but rather are intended to serve to illustrate the principles of the various exemplary embodiments. Various exemplary embodiments are described below with reference to the following figures.

DETAILED DESCRIPTION

The following detailed description refers to the accompanying figures, which show details and exemplary embodiments. These exemplary embodiments are described in sufficient detail that the person skilled in the art can carry out the invention. Other embodiments are also possible and the exemplary embodiments can be modified from a structural, logical and electrical standpoint, without departing from the subject matter of the invention. The different exemplary embodiments are not necessarily mutually exclusive, rather different embodiments can be combined with one another, thus giving rise to new embodiments. In the context of this description, the terms "connected", "attached" and "coupled" are used to describe either a direct or an indirect connection, a direct or indirect attachment and a direct or indirect coupling.

Figure 1:
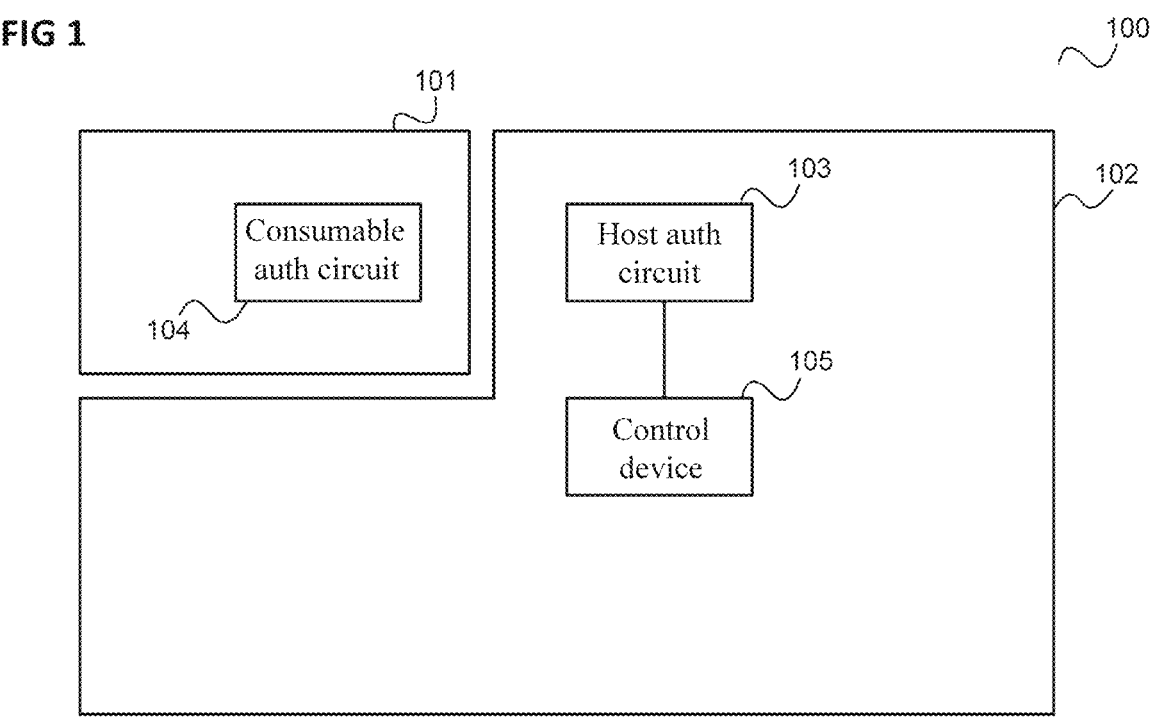
FIG. 1 shows a consumable arrangement, consisting of a consumable (also referred to as consumable component apparatus) and a consuming (or using) device (also referred to as consumer device).

FIG. 1 shows a consumable arrangement 100, consisting of a consumable 101 (also referred to as consumable component apparatus) and a consuming (or using) device 102 (also referred to as consumer device).

The consumable 101 is an apparatus which provides (and for example stores) a resource which is consumed during operation of the consuming device 102.

By way of example, the consumable contains a (physical) material which is consumed as in the case of a printer cartridge, an E-cigarette refill cartridge, a vaporizer cartridge for insecticides/insect repellants (e.g. pyrethrin/geraniol) or else a medical substance (e.g. drug) for a medical device in a corresponding container.

Examples of pairs of consumable 101 and consuming device 102 are: printer cartridge—printer; refill cartridge—inhaling device; and pesticide/insecticide/insect repellant—pesticide/insecticide/insect repellant container (e.g. anti-insect plug for plugging into a socket).

The consumable 101 is physically connected for example to the consuming device 102, e.g. is inserted or installed therein. The consumable 101 is typically connected to the consuming device 102 in an exchangeable (in particular releasable) manner.

The desire of the manufacturer of a consuming device 102 is typically that only consumables 101 manufactured by said manufacturer (or a licensee), can be used with the consuming device 102.

Therefore, provision can be made for the consuming device 102 to comprise a (host) authentication circuit 103, vis-à-vis which a (consumable) authentication circuit 104 must authenticate itself. The consuming device 102 comprises a control device 105, for example, which permits the operation of the consuming device 102 (also referred to as host) with the consumable 101 only if the consumable 101 has successfully authenticated itself at the host authentication circuit 103 of the consuming device 102 by means of a consumable authentication circuit 104.

Figure 2:
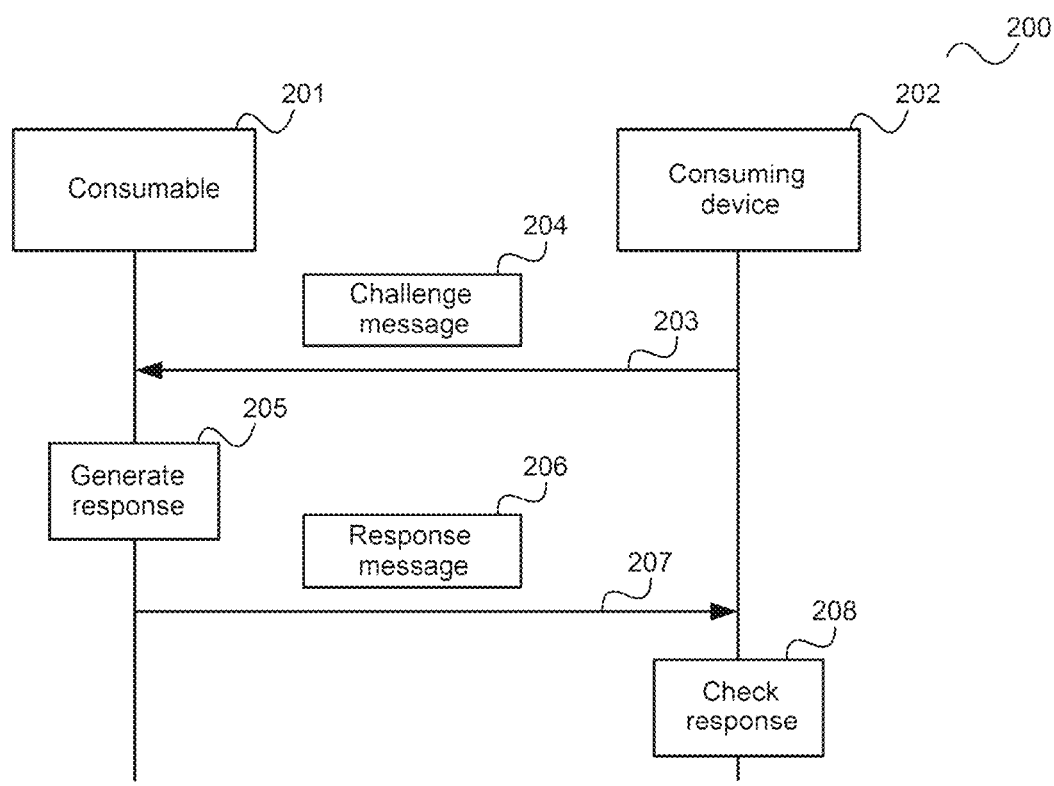
FIG. 2 shows a flow diagram for authenticating a consumable authentication circuit at a host authentication circuit.

FIG. 2 shows a flow diagram 200 for authenticating a consumable authentication circuit 201 at a host authentication circuit 202.

The consumable authentication circuit 201 and the host authentication circuit 202 correspond, for example, to the consumable authentication circuit 104 and the host authentication circuit 103, respectively, from FIG. 1.

For authenticating the consumable authentication circuit 201 at the host authentication circuit 202, in step 203 the host authentication circuit 202 transmits a challenge message 204 to the consumable authentication circuit 201. In step 205, the consumable authentication circuit 201 generates a response, which it communicates in the form of a response message 206 to the host authentication circuit 202 in step 207. In step 208, host authentication circuit 202 verifies that the response is correct, for example corresponds to the challenge, and authenticates the consumable authentication circuit 201 if that is the case.

By way of example, the host authentication circuit 202 inserts a random number into the challenge message 204, on the basis of which random number the consumable authentication circuit 201 must generate the response in a correct way in order to be authenticated by the host authentication circuit 202. By way of example, the authentication is based on Elliptic Curve Cryptography (ECC). The response may for example also be dependent on a cryptographic key negotiated between the consumable authentication circuit 201 and the host authentication circuit 202.

By way of an authentication circuit 104, e.g. in the form of an authentication chip, on a consumable 101, it is thus possible to ensure that a consuming device 102 uses only original consumable component apparatuses.

What is left open by this concept of the use of an authentication chip is the converse application. For a printer this would mean that an original cartridge is used in a non-original printer. This will not normally pose a problem for the manufacturer of the original cartridge. The viewpoint changes, however, if the consumable itself is to be protected against misuse. This applies to any consumable product which may potentially be harmful, e.g. depot medications (insulin), E-cigarette pods (nicotine), pesticide containers for thermal pesticide distribution apparatuses (pyrethrin) and may others. The concept of the use of an authentication chip is not suitable for protection against such misuse since, for the non-original consuming device (host device), the existence of an authentication chip in the original consumable is typically irrelevant and for such cases, for example, it might release random doses of the constituent of the consumable, which may constitute a health problem.

Cartridges or containers which contain hazardous constituents can comprise mechanical securing means which are specific to the respective host device, such that they cannot be used (e.g. inserted) with a different host device. However, this does not afford protection against improper construction of a non-original host device which is specifically configured such that the cartridges or containers are mechanically compatible with the non-original host device (e.g. fit therein).

In accordance with various embodiments, active means are provided which prevent an original consumable (e.g. a disposable apparatus such as a cartridge or a container) from being used with a non-original host device.

Figure 3:
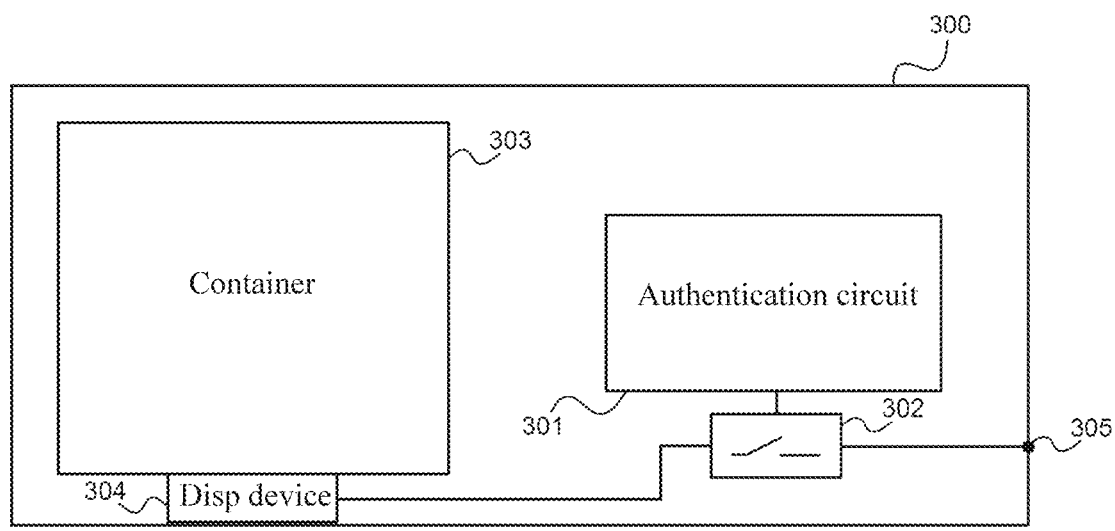
FIG. 3 shows a consumable component apparatus in accordance with one embodiment.

FIG. 3 shows a consumable component apparatus 300 in accordance with one embodiment.

Analogously to the consumable 101, the consumable component apparatus 300 comprises an authentication circuit (e.g. in an authentication chip) 301, with which the consumable component apparatus 300 can authenticate itself at an (original) consuming device, e.g. as described with reference to FIG. 2.

For protection against the use of the consumable 101 with a non-original consuming device, the consumable component apparatus 300 comprises a switch (e.g. a supply switch) 302 connected to the authentication circuit 301. Said switch can be provided externally to an authentication chip that implements the authentication circuit 301, can be integrated into said authentication chip or else be provided in the same package as the authentication chip (and be connected thereto e.g. by means of bonding wires).

The consumable component apparatus 300 comprises a container 303 having a consumable content (e.g. constituent substance or constituent material). The consumable content can be dispensed to a consuming device by way of a dispensing device (e.g. a valve or a closure) 304.

The dispensing device 304 is supplied with current via the switch 302 provided that the latter is correspondingly controlled (e.g. closed) by the authentication circuit. Conversely, the switch prevents the consumable component apparatus 300 from operating (i.e. from being activatable), that is to say dispensing the consumable content via the dispensing device 304, until the authentication circuit has allowed access to the consumable content (and closes the switch for feeding current to the dispensing device 304).

The switch 302 can supply the dispensing device for example with current that said switch receives from the consuming device via a current terminal 305.

In this way, the system (comprising original consumable and original consumer device) can be protected against both cases of illegal or undesired use:

(A) the use of non-original consumable component apparatuses in an original host device and (B) the use of an original consumable component in a non-original host device.

For protection against (A), provision can be made for an original host device to use a consumable component only if the latter authenticates itself at said host device, as described with reference to FIG. 2.

For protection against (B), provision can be made for the authentication circuit 301 to permit the original consumable component 300 to dispense its consumable content, that is to say e.g. to close the switch 302, only if the consuming device to which the consumable component 300 is connected has authenticated itself at the authentication circuit 301. This can be done as described by FIG. 2, for example, with the roles of consumable 201 and consuming device 202 being interchanged (i.e. the consumable sends the challenge and checks the response of the consuming device).

The authentication circuit can be configured in such a way that the protection that it is intended to afford against which of these cases (and whether against none, one or both of these cases) is selectable. If the manufacturer of the consumable component apparatus 300 decides, for example, that the latter cannot be used with non-original host devices, then the manufacturer can simply deactivate the functionality for protection against case (B) in the authentication circuit.

Various implementation variants are described below.

Figure 4:
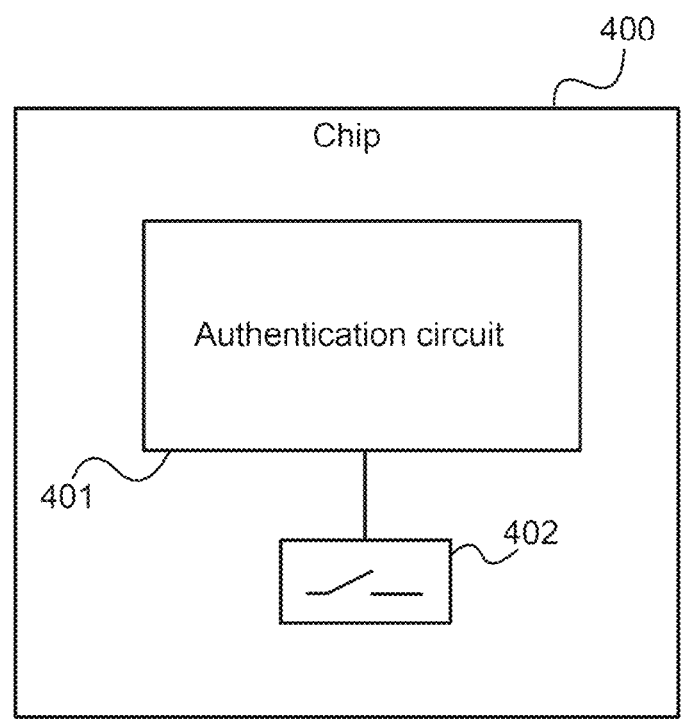
FIG. 4 shows an authentication chip in accordance with one embodiment.

FIG. 4 shows an authentication chip 400.

The authentication chip 400 comprises an authentication circuit 401 and a switch (e.g. supply switch) 402, i.e. an on-chip switch. The implementation of FIG. 4 can thus be regarded as a chip-integrated solution.

The on-chip switch 402 is for example a MOSFET (Metal Oxide Semiconductor Field Effect Transistor), e.g. a power MOSFET, which is controlled by the authentication circuit 401 by the latter setting its gate to a corresponding level. The authentication circuit 401 closes the on-chip switch 402 after a successful authentication of the consuming device at the authentication circuit 401 (e.g. in accordance with FIG. 2 with interchanged roles). The closing of the on-chip switch 402 allows the use of the consumable, i.e. the dispensing of the consumable content to the consuming device.

A non-original consuming device which does not use the authentication chip 400 (e.g. does not communicate therewith) or cannot authenticate itself at the authentication chip 400 is therefore prevented from using the original consumable.

Figure 5:
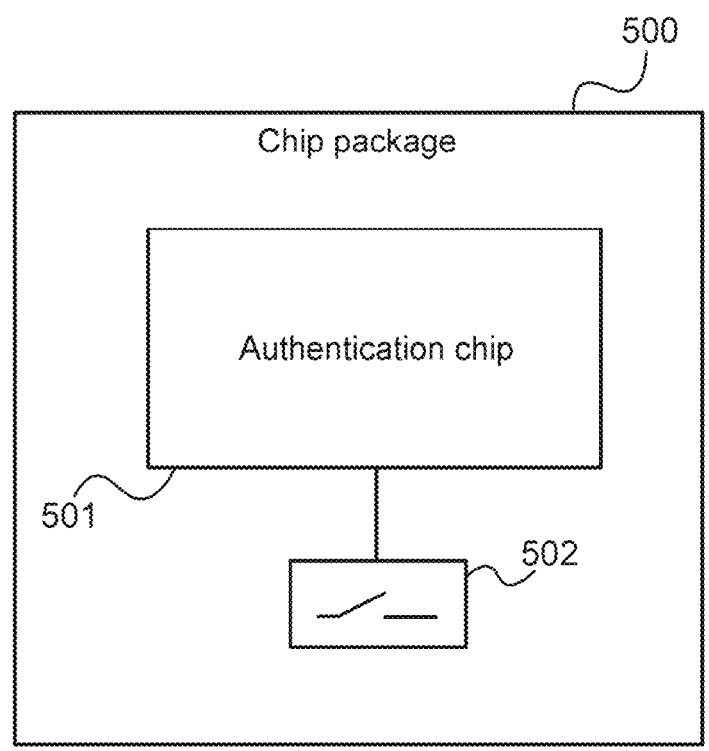
FIG. 5 shows an authentication chip package in accordance with one embodiment.

FIG. 5 shows an authentication chip package 500.

In this exemplary embodiment, a switch (e.g. supply switch) 502 is provided in the same chip package 500 as an authentication chip 501 that implements an authentication circuit. The implementation in FIG. 5 can thus be regarded as a package-integrated solution.

The authentication chip 501 communicates with the host device and comprises the switch 502 (e.g. a power MOSFET) in the same package 500, said authentication chip switching on (closing) said switch if the host device has authenticated itself successfully at said authentication chip. If the switch 502 is closed, this allows the host device to use the consumable.

A non-original consuming device which does not use the authentication chip 501 (e.g. does not communicate therewith) or cannot authenticate itself vis-à-vis the authentication chip 501 is therefore prevented from using the original consumable.

Figure 6:
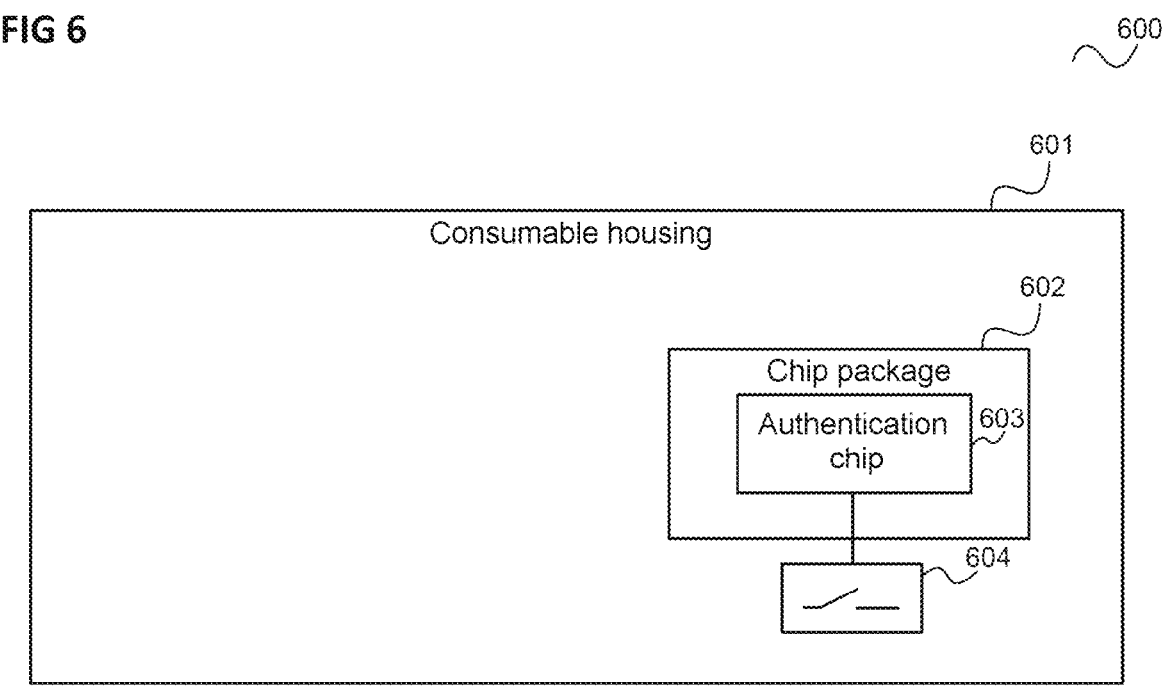
FIG. 6 shows a consumable in accordance with one embodiment.

FIG. 6 shows a consumable 600.

The consumable 600 has a housing 601, to which is fitted a chip package 602 containing an authentication chip 603.

The authentication chip 603 communicates with the host device and comprises an output pin connected to a separate switch 604 (e.g. a supply switch), for example to a separate power MOSFET (e.g. to the gate thereof).

The authentication chip 603 closes the switch 604 if the host device has successfully authenticated itself at said authentication chip. If the switch 604 is closed, this allows the host device to use the consumable.

A non-original consuming device which does not use the authentication chip 603 (e.g. does not communicate therewith) or cannot authenticate itself vis-à-vis the authentication chip 603 is therefore prevented from using the original consumable.

Figure 7:
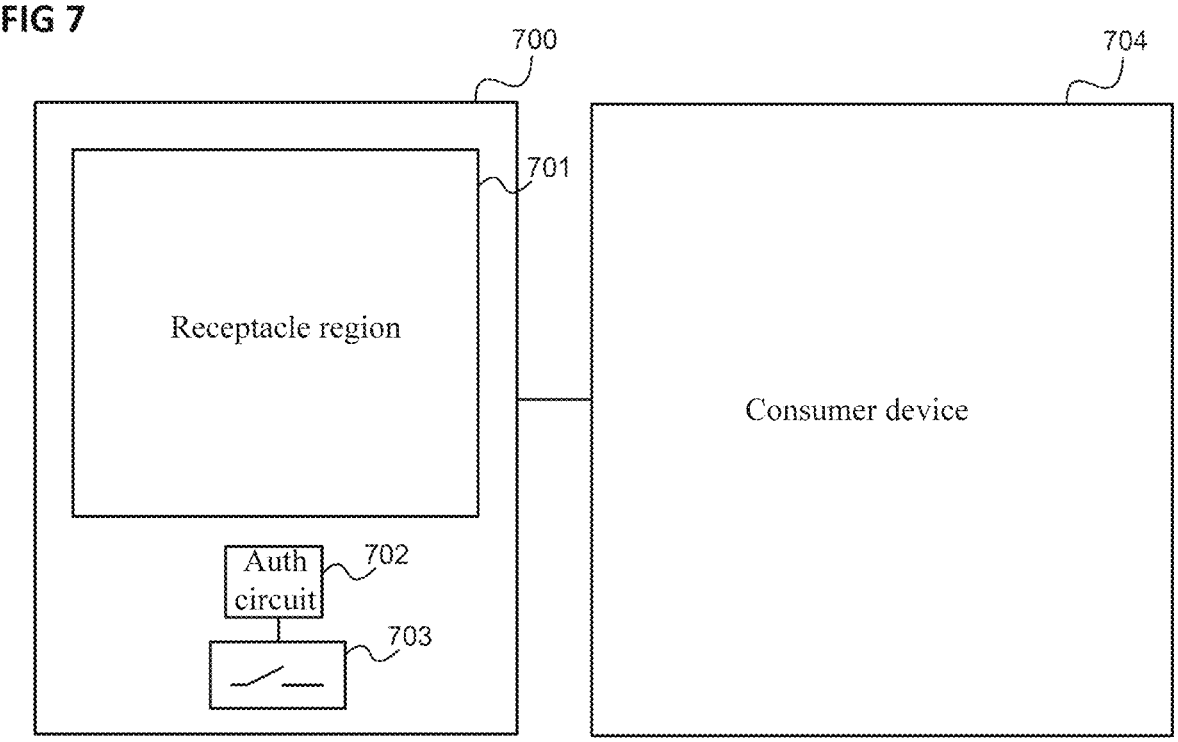
FIG. 7 shows a consumable component apparatus in accordance with one embodiment.

In summary, in accordance with various embodiments, a consumable component apparatus as illustrated in FIG. 7 is presented.

FIG. 7 shows a consumable component apparatus 700 in accordance with one embodiment.

The consumable component apparatus 700 comprises a receptacle region 701 for resuming a substance or material which is consumed under the control of a consumer device 704.

The consumable component apparatus 700 furthermore comprises an authentication circuit 702 for authenticating the consumer device 704.

Furthermore, the consumable component apparatus 700 comprises a switch 703 coupled to the authentication circuit 702.

The authentication circuit 702 is configured to control the switch in such a way that the consumable component apparatus 700 is activatable only if the consumer device 704 is authenticated by means of the authentication circuit, and that the consumable component apparatus 700 is deactivated if the consumer device 704 is not authenticated by means of the authentication circuit 702.

In other words, a consumable component apparatus (e.g. a consumable) is configured in such a way that it cooperates (i.e. is activatable) with a consuming device (to which it is connected, e.g. is inserted), i.e. dispenses its consumable content (substance or material) to the consuming device, only under the precondition that the consuming device has been authenticated at the consumable component apparatus.

Consumable component apparatus is understood to mean an apparatus having a housing (i.e. for example not having a plurality of physically separate components, e.g. having a plurality of separate housings). The consumable component apparatus together with the consumer device forms a consumable component device (also referred to as consumable component arrangement) comprising a plurality of apparatuses (e.g. each having a housing).

The authentication circuit can be provided both for carrying out an authentication of the consumable component apparatus at the consumer device and for carrying out an authentication of the consumer device at the consumable component apparatus. However, the consumable component apparatus can also comprise a second authentication circuit for carrying out an authentication of the consumable component apparatus at the consumer device.

Provision can also be made of a separate microcontroller (e.g. separate from the authentication circuit which authenticates the consumable component apparatus vis-à-vis a consumer device), which controls the main functions of the consumable component apparatus (i.e. the dispensing of a content, e.g. by means of a dispensing device). The microcontroller can communicate with the authentication circuit or can itself communicate with the consumer device and, after successful authentication of the consumer device at the authentication circuit or the microcontroller itself, the latter can enable the function (dispensing of the consumable content) by corresponding control of a switch (e.g. closing of a supply switch). If the consuming device is authenticated at the authentication circuit, then the control can thus be effected by way of the microcontroller.

The consumable component apparatus can furthermore comprise a current measuring device for measuring a current flow into the consumable component apparatus, wherein the authentication circuit is furthermore configured to take account of the measured current flow in the context of the authentication and/or activation of the consumable component apparatus. By way of example, the authentication circuit compares the measured current flow with a predefined current flow limit value and is configured to control the switch in such a way that the consumable component apparatus is activatable only if the current flow does not exceed the current flow limit value. As a result, it is possible to avoid misuse as a result of increased current feeding that would bring about an increased dispensing of consumable content. The current flow limit value can be stored in the authentication circuit, for example. For the purpose of current measurement and for the purpose of processing the measured current, the authentication circuit can comprise an analog/digital converter, for example.

Various exemplary embodiments are specified below.

Exemplary embodiment 1 is a consumable component apparatus, comprising a receptacle region for receiving a substance or material which is consumed under the control of a consumer device, an authentication circuit for authenticating the consumer device, and a switch coupled to the authentication circuit, wherein the authentication circuit is configured to control the switch in such a way that the consumable component apparatus is activatable only if the consumer device is authenticated by means of the authentication circuit, and that the consumable component apparatus is deactivated if the consumer device is not authenticated by means of the authentication circuit.

Exemplary embodiment 2 is a consumable component apparatus according to exemplary embodiment 1, wherein the receptacle region has a volume of a maximum of approximately 0.5 dm³, optionally a maximum of approximately 0.25 dm³, optionally a maximum of approximately 0.1 dm³.

Exemplary embodiment 3 is a consumable component apparatus according to exemplary embodiment 1 or 2, comprising a mechanical interface for mechanically coupling the consumable component apparatus to the consumer device.

Exemplary embodiment 4 is a consumable component apparatus according to exemplary embodiment 3, wherein the mechanical interface is furthermore configured for transferring the substance or the material from the receptacle region to the consumer device.

Exemplary embodiment 5 is a consumable component apparatus according to any of exemplary embodiments 1 to 4, wherein the switch is configured as a transistor.

Exemplary embodiment 6 is a consumable component apparatus according to any of exemplary embodiments 1 to 5, furthermore comprising a current measuring device for measuring a current flow into the consumable component apparatus, wherein the authentication circuit is furthermore configured to take account of the measured current flow in the context of the authentication and/or activation of the consumable component apparatus.

Exemplary embodiment 7 is a consumable component apparatus according to any of exemplary embodiments 1 to 6, furthermore comprising a dispensing device configured for dispensing the substance or material, wherein the dispensing device is activatable only if the consumer device is authenticated by means of the authentication circuit, and wherein the dispensing device is deactivated if the consumer device is not authenticated by means of the authentication circuit.

Exemplary embodiment 8 is a consumable component apparatus according to exemplary embodiment 7, wherein the authentication circuit is configured to control the dispensing device in such a way that it dispenses the substance or the material only if the consumer device is authenticated by means of the authentication circuit, and that the consumable component apparatus does not dispense the substance or the material if the consumer device is not authenticated by means of the authentication circuit.

Exemplary embodiment 9 is a consumable component apparatus according to exemplary embodiment 7 or 8, comprising a current supply, wherein the switch is configured to supply the dispensing device with current from the current supply.

Exemplary embodiment 10 is a consumable component apparatus according to exemplary embodiment 9, wherein the authentication circuit is configured to control the switch in such a way that it supplies the dispensing device with current only if the consumer device is authenticated by means of the authentication circuit, and that it does not supply the dispensing device with current if the consumer device is not authenticated by means of the authentication circuit.

Exemplary embodiment 11 is a consumable component apparatus according to any of exemplary embodiments 1 to 10, wherein the authentication circuit is configured to authenticate the consumer device on the basis of a communication with the consumer device.

Exemplary embodiment 12 is a consumable component apparatus according to any of exemplary embodiments 1 to 11, comprising a chip comprising the authentication circuit and the switch.

Exemplary embodiment 13 is a consumable component apparatus according to any of exemplary embodiments 1 to 11, comprising a chip package containing an authentication chip having the authentication circuit and containing the switch outside the authentication chip.

Exemplary embodiment 14 is a consumable component apparatus according to any of exemplary embodiments 1 to 11, comprising a chip package containing an authentication chip having the authentication circuit, wherein the consumable component apparatus contains the switch outside the chip package.

Exemplary embodiment 15 is a consumable component apparatus according to any of exemplary embodiments 1 to 14, wherein the receptacle region is a container and wherein the authentication circuit and the switch are secured to the container.

Exemplary embodiment 16 is a consumable component apparatus according to any of exemplary embodiments 1 to 15, wherein the consumable component apparatus is a printer cartridge, an inhalation device or an anti-insect plug.

Exemplary embodiment 17 is a consumable component apparatus according to any of exemplary embodiments 1 to 16, wherein the substance or the material is a pesticide, an insecticide, ink or an inhalation liquid.

Exemplary embodiment 18 is a consumable component device, comprising a consumable component apparatus according to any of exemplary embodiments 1 to 17, and the consumer device connected to the consumable component apparatus.

Although the invention has been shown and described primarily with reference to specific embodiments, it should be understood by those familiar with the technical field that numerous modifications can be made with regard to configuration and details thereof, without departing from the essence and scope of the invention as defined by the claims hereinafter. The scope of the invention is therefore determined by the appended claims, and the intention is for all modifications to be encompassed which come under the literal meaning or the scope of equivalence of the claims.

LIST OF REFERENCE SIGNS

100 Consumable arrangement
101 Consumable
102 Consuming device
103 Host authentication circuit
104 Consumable authentication circuit
105 Control device
200 Flow diagram
201 Consumable authentication circuit
202 Host authentication circuit
203 Sequence step
204 Challenge message
205 Sequence step
206 Response message
207, 208 Sequence steps
300 Consumable component apparatus
301 Authentication circuit
302 Switch
303 Container
304 Dispensing device
305 Current terminal
400 Authentication chip
401 Authentication circuit
402 Switch
500 Authentication chip package
501 Authentication chip
502 Switch
600 Consumable 601 Housing
602 Chip package
603 Authentication chip
604 Switch
700 Consumable component apparatus
701 Receptacle region
702 Authentication circuit
703 Switch
704 Consumer device

The invention claimed is:

1. A consumable component apparatus, comprising:
a receptacle region configured to receive a substance or material which is dispensable from the consumable component apparatus to a consumer device under the control of the consumer device when the consumable component apparatus is inserted or installed in the consumer device;
an authentication circuit configured to authenticate the consumer device; and
a switch coupled to the authentication circuit,
wherein the authentication circuit is configured to control the switch in such a way that the consumable component apparatus is activatable only if the consumer device is authenticated by means of the authentication circuit, and that the consumable component apparatus is deactivated if the consumer device is not authenticated by means of the authentication circuit, to thereby prevent the consumable component apparatus from being used with an unauthorized or non-genuine consumer device.

2. The consumable component apparatus as claimed in claim 1, wherein the receptacle region has a volume of a maximum of approximately 0.5 dm3.

3. The consumable component as claimed in claim 1, wherein the receptacle region has a volume of a maximum of approximately 0.25 dm3.

4. The consumable component as claimed in claim 1, wherein the receptacle region has a volume of a maximum of 0.1 dm3.

5. The consumable component apparatus as claimed in claim 1, further comprising:
a mechanical interface configured to mechanically couple the consumable component apparatus to the consumer device.

6. The consumable component apparatus as claimed in claim 5, wherein the mechanical interface is configured to transfer the substance or the material from the receptacle region to the consumer device.

7. The consumable component apparatus as claimed in claim 1, wherein the switch is configured as a transistor.

8. The consumable component apparatus as claimed in claim 1, further comprising:
a current measurer configured to measure a current flow into the consumable component,
wherein the authentication circuit is further configured to take account of the measured current flow in the context of the authentication and/or activation of the consumable component apparatus.

9. The consumable component apparatus as claimed in claim 1, further comprising:
a dispenser configured to dispense the substance or material, wherein the dispenser is activatable only if the consumer device is authenticated by means of the authentication circuit, and the dispenser is deactivated if the consumer device is not authenticated by means of the authentication circuit.

10. The consumable component apparatus as claimed in claim 9, wherein the authentication circuit is configured to control the dispenser in such a way that the dispenser dispenses the substance or the material only if the consumer device is authenticated by means of the authentication circuit, and that the consumable component apparatus does not dispense the substance or the material if the consumer device is not authenticated by means of the authentication circuit.

11. The consumable component apparatus as claimed in claim 9, further comprising:
a current supply, wherein the switch is configured to supply the dispenser with current from the current supply.

12. The consumable component apparatus as claimed in claim 11, wherein the authentication circuit is configured to control the switch in such a way that the switch supplies the dispenser with current only if the consumer device is authenticated by means of the authentication circuit, and that the switch does not supply the dispenser with current if the consumer device is not authenticated by means of the authentication circuit.

13. The consumable component apparatus as claimed in claim 1, wherein the authentication circuit is configured to authenticate the consumer device on the basis of a communication with the consumer device.

14. The consumable component apparatus as claimed in claim 1, further comprising:
a chip comprising the authentication circuit and the switch.

15. The consumable component apparatus as claimed in claim 1, further comprising:
a chip package containing an authentication chip having the authentication circuit and containing the switch outside the authentication chip.

16. The consumable component apparatus as claimed in claim 1, further comprising:
a chip package containing an authentication chip having the authentication circuit, wherein the consumable component apparatus contains the switch outside the chip package.

17. The consumable component apparatus as claimed in claim 1, wherein the receptacle region is a container, and the authentication circuit and the switch are secured to the container.

18. The consumable component apparatus as claimed in claim 1, wherein the consumable component apparatus is a printer cartridge, an inhalation device or an anti-insect plug.

19. The consumable component apparatus as claimed in any of claim 1, wherein the substance or the material is a pesticide, an insecticide, ink or an inhalation liquid.

20. A consumable component device, comprising:
a consumable component apparatus as claimed in claim 1, wherein the consumer device is connected to the consumable component apparatus.

21. The consumable component apparatus as claimed in claim 1, wherein the authentication circuit is configured to authenticate that the consumer device is an original consumer device rather than a counterfeit consumer device.

* * * * *